United States Patent
Wang et al.

(10) Patent No.: US 8,705,881 B2
(45) Date of Patent: Apr. 22, 2014

(54) MOTION DEBLURRING FOR TEXT IMAGES

(75) Inventors: Jue Wang, Kenmore, WA (US); Hojin Cho, Pohang (KR); Jen-Chan Chien, Saratoga, CA (US); Sarah A. Kong, Cupertino, CA (US); Seungyong Lee, Pohang (KR)

(73) Assignee: Adobe Systems Incorporated, San Jose, CA (US)

( * ) Notice: Subject to any disclaimer, the term of this patent is extended or adjusted under 35 U.S.C. 154(b) by 90 days.

(21) Appl. No.: 13/475,483

(22) Filed: May 18, 2012

(65) Prior Publication Data

US 2013/0058587 A1 Mar. 7, 2013

Related U.S. Application Data

(60) Provisional application No. 61/530,896, filed on Sep. 2, 2011.

(51) Int. Cl.
*G06K 9/40* (2006.01)
*G06K 9/64* (2006.01)

(52) U.S. Cl.
USPC .......................................... 382/255; 382/279

(58) Field of Classification Search
None
See application file for complete search history.

(56) References Cited

U.S. PATENT DOCUMENTS

| | | | |
|---|---|---|---|
| 6,266,439 B1 * | 7/2001 | Pollard et al. | 382/164 |
| 6,301,386 B1 * | 10/2001 | Zhu et al. | 382/176 |
| 6,470,097 B1 * | 10/2002 | Lai et al. | 382/255 |
| 8,380,000 B2 | 2/2013 | Lee et al. | |
| 8,411,980 B1 * | 4/2013 | Wang et al. | 382/254 |
| 2010/0166332 A1 * | 7/2010 | Lee et al. | 382/255 |
| 2011/0090352 A1 | 4/2011 | Wang et al. | |
| 2011/0102642 A1 | 5/2011 | Wang et al. | |
| 2013/0058588 A1 | 3/2013 | Wang | |

OTHER PUBLICATIONS

Cho, S. and Lee, S., Fast Motion Deblurring, 2009, ACM Transactions on Graphics, vol. 28, No. 5, pp. 145:1-145:8.*
Chen, X., He, X., Yang, J., and Wu, Q., An Effective Document Image Deblurring Algorithm, 2011, 2011 IEEE Conference on Computer Vision and Pattern Recognition, pp. 369-376.*
Wang, Y., Yang, J., Yin., W., and Zhang, Y. A New Alternating Minimization Algorithm for Total Variation Image Reconstruction, 2008, J. Imaging Sci., vol. 1, No. 3, pp. 248-272.*
Joshi, N Szeliski, R., and Kriegman, D.J., PSF Estimation using Sharp Edge Prediction, 2008, IEEE Conference on Computer Vision and Pattern Recognition, pp. 1-8.*
Su, B., Lu, S., and Lim T.C., Restoration of Motion Blurred Document Images, 2012, SAC '12, pp. 767-771.*
Blanz, V., and Vetter, T. A morphable model for the synthesis of 3d faces. In Proceedings of ACM SIGGRAPH, 187-194. 1999.
Romdhani, S., and Vetter, T. 2003. Efficient, robust and accurate fitting of a 3d morphable model. In Proceedings of ICCV, 59-66.

(Continued)

*Primary Examiner* — Stephen R Koziol
*Assistant Examiner* — Jonathan S Lee
(74) *Attorney, Agent, or Firm* — Wolfe-SBMC

(57) ABSTRACT

Various embodiments of methods and apparatus for motion deblurring in text images are disclosed. In one embodiment, a threshold-based text prediction for a blurred image is generated. A point spread function for the blurred image is estimated. A result of the threshold-based text prediction function is deconvolved based on the point spread function. The generating, estimating, and deconvolving are iterated at a plurality of scales, and a final deconvolution of a result of the iteratively deconvolving is executed.

14 Claims, 24 Drawing Sheets

(56) References Cited

OTHER PUBLICATIONS

Dovgard, R., and Basri, R. 2004. Statistical symmetric shape from shading for 3d structure recovery of faces. In Proceedings of ECCV, 99-113.

Kemelmacher-Shlizerman, I., and Basri, R. 2011. 3d face reconstruction from a single image using a single reference face shape. IEEE Trans. Pattern Analysis and Machine Intelligence 33, 394-405.

Fei Yang, Jue Wang, Eli Shechtman, Lubomir Bourdev, Dimitris Metaxas. Expression Flow for 3D-Aware Face Component Transfer. ACM Transactions on Graphics (Proceedings of SIGGRAPH 2011), 2011.

M. A. O. Vasilescu, D. Terzopoulos, "Multilinear Analysis of Image Ensembles: TensorFaces," Proc. 7th European Conference on Computer Vision (ECCV'02), Copenhagen, Denmark, May 2002, in Computer Vision—ECCV 2002, pp. 1-22.

M. A. O. Vasilescu, D. Terzopoulos,"Multilinear Image Analysis for Facial Recognition", Proceedings of International Conference on Pattern Recognition (ICPR 2002), vol. 2, Quebec City, Canada, Aug. 2002, 511-514.

Vlasic, D., Brand, M., Pfister, H., and Popovi'C , J. 2005. Face transfer with multilinear models. In Proceedings of ACM SIGGRAPH, vol. 24, 426-433.

J. Saragih, S. Lucey and J. Cohn, "Deformable Model Fitting by Regularized Landmark Mean-Shift", International Journal of Computer Vision (IJCV). pp. 200-215.

Atul Kanaujia, Yuchi Huang, Dimitris N. Metaxas, "Tracking Facial Features Using Mixture of Point Distribution Models", ICVGIP 2006: 492-503.

Cootes, T., Taylor, C., Cooper, D., and Graham, J. "Active shape models: Their training and application", Computer Vision and Image Understanding 61, 1, 38-59, 1995.

Cootes, T. F., Edwards, G. J., and Taylor, C. J. "Active appearance models", IEEE Trans. Pattern Analysis and Machine Intelligence 23, 681-685, 2001.

"Non-Final Office Action", U.S. Appl. No. 13/480,119, filed Oct. 24, 2013, 14 pages.

Fergus, et al.,' "Removing Camera Shake from a Single Photograph", Retrieved from <http://people.csail.mit.edu/fergus/papers/deblur_fergus.pdf> on Nov. 28, 2012, 2006, 8 pages.

Krishnan, et al.,' "Fast Image Deconvolution using Hyper-Laplacian Priors", Retrieved from <http://www.cs.nyu.edu/~fergus/papers/fid_nips09.pdf> on Nov. 28, 2012, 2009, 9 pages.

Levin, et al.,' "Efficient Marginal Likelihood Optimization in Blind Deconvolution", Computer Science and Artificial Intelligence Laboratory Technical Report, MIT-CSAIL-TR-2011-202, Apr. 4, 2011, 14 pages.

Levin, et al.,' "Image and Depth from a Conventional Camera with a Coded Aperture", ACM Transactions on Graphics, SIGGRAPH 2007 Conference Proceedings, San Diego, CA, Retrieved from <http://groups.csail.mit.edu/graphics/CodedAperture/CodedAperture-LevinEtAl-SIGGRAPH07.pdf> on Dec. 21, 2012,2007, 9 pages.

Shan, et al.,' "High-quality Motion Deblurring from a Single Image", Retrieved from <http://www.google.com/url?sa=t&rct=j&q=&esrc=s&source=web&cd=2&ved=0CEMQFjAb&url=http%3A%2F%2Fciteseerx.ist.psu.ed%Fviewdoc%2Fdownload%3Fdoi%3D10.1.1.218.6835%26rep%3Drep1%26type%3Dpdf&ei=yjm1UIT6O4iLiAKTooCoAQ&usg=AFQjCNGjzsbOGrl-6NYlkUK, ACM Trans. Graphics, 27(3):73:1-73:10,Aug. 2008, 10 pages.

Sun, et al.,' "Image Super-Resolution Using Gradient Profile Prior", Proceedings of CVPR 2008, 2008, 8 pages.

Xu, et al.,' "Two-Phase Kernel Estimation for Robust Motion Deblurring", Retrieved from <http://www.google.com/url?sa=t&rct=j&q=&esrc=s&source=web&cd=1&ved=0CDgQFjAA&url=http%3A%2F%2Fciteseerx.ist.psu.edu%2Fviewdoc%2Fdownload%3Fdoi%3D10.1.1.170.6990%26rep%3Drep1%26type%3Dpdf&ei=z0C1UNT6EsSfiAKkm4HgDA&usg=AFQjCNExeYfpnDxf6vY-tvU, Proceedings ECCV 2010,2010, 14 pages.

\* cited by examiner

Blurred input image 200

Deblurred result using interpolation 215
Deblurred result using gradient profile upsampling 220
FIG. 2D
FIG. 2E

Deblurred result using interpolation 225
Deblurred reult using gradient profile upsampling 230
FIG. 2F
FIG. 2G Deblurred result using interpolation
235
Deblurred reult using gradient profile upsampling
240
FIG. 2H
FIG. 2I (a) Input text blurred image (b) Deblurring result of the proposed method

MOTION DEBLURRING FOR TEXT IMAGES

This application claims benefit of priority to U.S. Provisional Application Ser. No. 61/530,896, which was filed on Sep. 2, 2011.

BACKGROUND

Description of the Related Art

The recent profusion of inexpensive digital cameras has enabled the creation of a much broader universe of digital image content. New market entrants are now able to bring image capture to environments and events for which such image capture was previously considered cost prohibitive or technically unfeasible. In the past few decades, cameras have become smaller and more robust, and therefore portable to environments where photography was previously considered to be extremely difficult due to either the harshness of the environment or the inconvenience of introducing the camera equipment form factor into the space where the camera was desired.

Modern digital cameras are also able to capture more images to smaller media and remain in service for a greater number of exposures, thereby increasing the desirability of a camera in situations where cameras were previously not worth the inconvenience. Further, advances in the material design of camera cases have created a generation of cameras that may be used in harsh environments, such as extreme temperature or exposure to moisture. Many of the environments and events to which cameras are now introduced are highly dynamic, in terms of camera motion, and lead to the creation of images with cameras that are being moved during image capture with motion patterns that are not easily predicted or arranged in advance.

Unfortunately, a frequent result of a moving camera is an output image that is randomly blurred or otherwise distorted. Image deblurring is the process of recovering a sharp image with reduced motion blur or other distortion. A number of real-world problems from astronomy to consumer imaging reflect demand for improvements in the ability to deblur an image or set of images to discover latent image details.

SUMMARY

Various embodiments of methods and apparatus for motion deblurring in text images are disclosed. In one embodiment, a threshold-based text prediction for a blurred image is generated. A point spread function for the blurred image is estimated. A result of the threshold-based text prediction function is deconvolved based on the point spread function. The generating, estimating, and deconvolving are iterated at a plurality of scales, and a final deconvolution of a result of the iteratively deconvolving is executed.

BRIEF DESCRIPTION OF THE DRAWINGS

FIG. 2D depicts a deblurred result using conventional methods.

FIG. 2E illustrates a deblurred result using blur reduction incorporating gradient profile upsampling.

FIG. 2F depicts a deblurred result using conventional methods.

FIG. 2G illustrates a deblurred result using blur reduction incorporating gradient profile upsampling according to some embodiments.

FIG. 2H depicts a deblurred result using conventional methods.

FIG. 2I illustrates a deblurred result using blur reduction incorporating gradient profile upsampling according to some embodiments.

Figure 1:
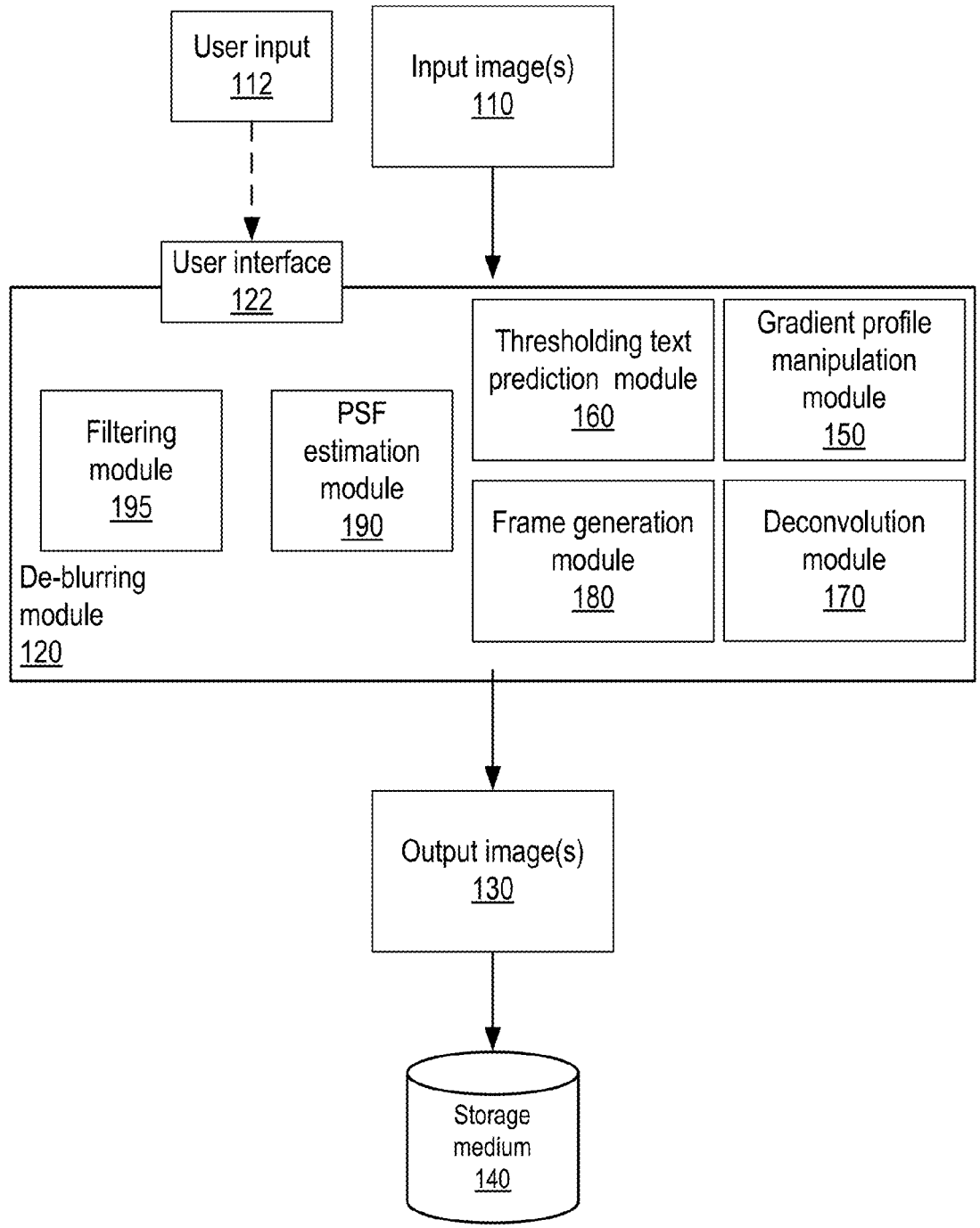
FIG. 1 depicts a module that may implement deblurring of images according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art.

An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Embodiments of automated procedures for removing motion blur from images captured, such as those captured by cameras that are vibrating at the time of image capture, are disclosed. Methods and systems for blur reduction incorporating gradient profile upsampling are disclosed in some embodiments. Methods and systems for text blur reduction using threshold-based text prediction are disclosed in some embodiments. Some embodiments may likewise deploy both methods and systems for text blur reduction using threshold-based text prediction, as described herein, and blur reduction incorporating gradient profile upsampling, as described herein, in a single embodiment. While the embodiments described below are explained with reference to only single still images, one of skill in the art will readily understand in light of having read the present disclosure that the techniques described below are applicable to extracting a latent image from an input image plurality of arbitrary size, including a motion picture frame sequence or other multimedia, without departing from the scope and intent of the embodiments described below.

Introduction to Blur Reduction Incorporating Gradient Profile Upsampling

Some embodiments include a means for performing deblurring through iterative upscaling of an image. For example, in some embodiments a deblurring module may receive input identifying an image for which deblurring is desired and may repeat from a course to fine scale generating an estimate of a latent image from a blurred image using an upsampling super-resolution function, and estimating a blur kernel based on the estimate of the latent image and the blurred image. Such a deblurring module may then perform generating a final image estimate. In some embodiments, the generating the final image estimate includes performing a deconvolution of the latent image using the blur kernel and the blurred image. The deblurring module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform repeating from a course to fine scale generating an estimate of a latent image from a blurred image using an upsampling super-resolution function, and estimating a blur kernel based on the estimate of the latent image and the blurred image. The computer-readable storage medium may further store program instructions executable by the one or more processors to cause the computing apparatus to perform generating a final image estimate. In some embodiments, the generating the final image estimate includes performing a deconvolution of the latent image using the blur kernel and the blurred image, as described herein. Other embodiments of the deblurring module may be at least partially implemented by hardware circuitry and/or firmware stored, for example, in a non-volatile memory.

In some embodiments, generating the estimate of the latent image of the blurred image using the super-sampling function further includes estimating a gradient of a transformed latent image and estimating the latent image at an increased scale using a function of the gradient of the transformed latent image. In some embodiments, the generating the estimate of the latent image of the blurred image using the super-sampling function further includes estimating a gradient of a transformed latent image as a function of the gradient of an initial latent image and estimating the latent image at the increased scale using a function of the gradient of the transformed latent image. In some embodiments, the generating the estimate of the latent image of the blurred image using the super-sampling function further includes estimating a gradient of a transformed latent image as a function of the gradient of an initial latent image and estimating the latent image at the increased scale using a sum of a square of an absolute value of a difference of a convolution of a blur kernel with the estimate of the latent image and an initial blurred image and a function of a square of an absolute value of a difference of a gradient of the estimate of the latent image and the gradient of the transformed latent image.

In some embodiments, performing a deconvolution of the latent image using the blur kernel and the blurred image further includes calculating a final latent image using a sum of a square of an absolute value of a difference of a convolution of the latent image with a blur kernel, and the blurred image and regularization function. In some embodiments, the regularization function comprises a hyperlaplacian prior. In some embodiments, the upsampling super-resolution function further comprises a gradient-preserving upsampling function.

Some embodiments include a multi-scale processing method in image deblurring. Some such embodiments perform super-resolution image reconstruction to estimate an initial latent image in multi-scale blind deblurring. FIGS. 2D-2 show comparisons between deblurring results of previous methods (i.e., interpolation based multi-scale deblurring) and some embodiments performing super-resolution based multi-scale deblurring.

Embodiments are described in terms of a convolutional blur model which is defined as B=K*L+N; (1) where B is a blurred image, K is a motion blur kernel or a point spread function (PSF), L is a latent image that embodiments attempt to recover, N is unknown noise introduced during image acquisition, and * is the convolution operator. Such a model is represented graphically in FIG. 6, which is described below. As one of skill in the art will readily ascertain in view of having read the present disclosure, however, embodiments are not limited with respect to deblurring method and the types of motions. In other words, the disclosed embodiments are meant as examples of methods and systems that can be applied to any kinds of deblurring that are performed in a coarse to fine manner (i.e., multi-scale setting), and to deblur uniform motions or non-uniform motions.

Figure 3:
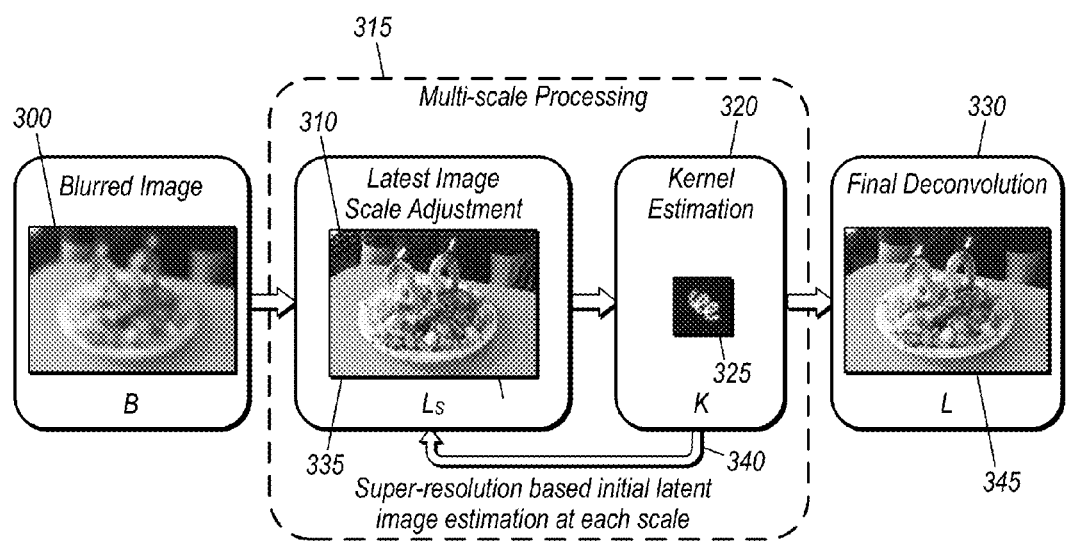
FIG. 3 depicts a process for blur reduction using blur reduction incorporating gradient profile upsampling according to some embodiments.

Some embodiments employ the estimation of the initial latent image at each scale in multi-scale image deblurring. Some embodiments use the latent image of the previous scale (i.e., the coarser level) as input and then estimate a sharp latent image for the current scale (i.e., the finer level) using super-resolution methods. FIG. 3-FIG. 4C show flowcharts of operations for implementing some embodiments. Some embodiments employ a coarse to fine scheme to deblur images to estimate the blur kernel more efficiently, to deal with large blurs, and to avoid local minima.

An overall algorithm according to one embodiment includes:

---
Algorithm 1 Multi-scale image deblurring method procedure DEBLUR(B)
    L ← B
    for coarse to fine do
        $L_S$ ← EstimateInitialLatentImageUsingSuperResolution(L)
        K ← EstimatePSF($L_S$,B)
    end for
    L ← FinalDeconvolve(K,B)
end procedure

---

In some embodiments an initial latent image $L_S$ image is estimated at a current scale with the latent image from the coarser scale (i.e., previous level). To do so, some embodiments apply an image super-resolution method. In such embodiments, any super-resolution method can be applied. Some embodiments apply super-resolution method in multi-scale image deblurring. Some embodiments include a multi-scale deblurring which uses an image super-resolution method using a gradient profile prior, to which the distribution of the gradient profile is fitted using a generalized Gaussian distribution (GGD), which is defined as, $$g(x; \sigma, \lambda) = \frac{\lambda \alpha(\lambda)}{2\sigma \Gamma\left(\frac{1}{\lambda}\right)} \exp\left\{-\left[\alpha(\lambda)\left|\frac{x}{\sigma}\right|\right]^\lambda\right\}, \quad (2)$$

where $\Gamma(\cdot)$ is the gamma function and $$\alpha(\lambda) = \sqrt{\Gamma\left(\frac{3}{\lambda}\right) \Big/ \Gamma\left(\frac{1}{\lambda}\right)}$$

is the scaling factor that makes the second moment of GGD equal to $\sigma^2$. $\sigma$ is the sharpness of the gradient profile and can be estimated using the second moment of the profile, and $\lambda$ is the shape parameter which controls the overall shape of the distribution. In some embodiments, $\lambda = 1.6$ is used for natural images.

Given the latent image of a coarse level, $L_l$, and the latent image of a fine level, $L_h$, embodiments can compute gradient profiles, $\{\sigma_l, \lambda_l\}$ from $L_l$ and $\{\sigma_h, \lambda_h\}$ from $L_h$. Referring the gradient profiles, the ratio between two gradient profiles is $$r(d) = \frac{g(d; \sigma_h, \lambda_h)}{g(d; \sigma_l, \lambda_l)}$$

$$= c \cdot \exp\left\{-\left(\frac{\alpha(\lambda_h) \cdot |d|}{\sigma_h}\right)^{\lambda_h} + \left(\frac{\alpha(\lambda_l) \cdot |d|}{\sigma_l}\right)^{\lambda_l}\right\},$$

where $$c = \frac{\lambda_h \cdot \alpha(\lambda_h) \cdot \sigma_l \cdot \Gamma(1/\lambda_l)}{\lambda_l \cdot \alpha(\lambda_l) \cdot \sigma_h \cdot \Gamma(1/\lambda_h)}$$

and d is the curve distance to the edge pixel along the gradient profile. Using the computed ratio r(d), embodiments estimate the gradient of the initial latent image $L_h$ using the gradient transform equation $\nabla L_h^T(x) = r(d(x, x_0)) \cdot \nabla L_I^u(x)$, (3) where $x_0$ is the edge pixel of the gradient profile passing through x, and $d(x, x_0)$ is the distance between x and $x_0$ along gradient profile. $L^u_I$ is the interpolated image of $L_I$.

Some embodiments directly solve the following equation with the transformed gradient $L_h^T$ as a prior $E_{L_S}(L_S) = \|G*L_S - L_I^u\|^2 + \lambda \|\nabla L_S - \nabla L_h^T\|^2$, (4) where G is a Gaussian kernel to approximate the blurriness of $L^u_I$. Because Eq. (4) is a quadratic function, some embodiments optimize it using a Fast Fourier Transform (FFT).

The applicability of some embodiments to any type of image deblurring enables embodiments to use any previous deblurring methods for kernel estimation and deconvolution. For example, some embodiments perform kernel estimation by estimating the blur kernel K using the current L and the input blurred image B by optimizing $E_K(K) = \|K*\nabla L - \nabla B\|^2 + \lambda_K \rho_K(K)$, (5) where L is the current estimate of the latent image, $\nabla$ is the derivative operator, $\rho_K$ is a regularization function for stabilizing the linear system, and $\lambda_k$ is a relative weight for the regularization term. In some embodiments, $\rho_K(K) = \|K\|^2$.

In a final deconvolution step, some embodiments compute the final image L with the input blurred image B and the estimated PSF K by optimizing $E_L(L) = \|K*L - B\|^2 + \lambda_L \rho_L(L)$ (6) where $\rho_L$ is an image prior or a regularization function, such as a Laplacian prior of the form $$\rho_L(L) = \sum_p |\partial_x L(p)|^\alpha + \sum_p |\partial_y L(p)|^\alpha, \quad (7)$$

where p indexes each pixel position in L, and $\partial_x$ and $\partial_y$ are x- and y-directional derivative operators, respectively. $\lambda_k$ is a relative weight for the regularization term. In some embodiments, $\alpha = 0.8$ is used. Some embodiments optimize equation 6 using a least squares method.

Introduction to Text Blur Reduction Using Threshold-Based Text Prediction

Some embodiments may include a means for deblurring text images. For example, a text deblurring module may receive input identifying a portion of a digital image in which text is included, and may perform generating a threshold-based text prediction for a blurred image, estimating a point spread function for the blurred image, and deconvolving a result of the threshold-based text prediction function based on the point spread function. Embodiments may then perform iterating at a plurality of scales the generating, estimating, and deconvolving. After the iterating, embodiments may perform executing a final deconvolution of a result of the iteratively deconvolving, as described herein. The text deblurring module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform generating a threshold-based text prediction for a blurred image, estimating a point spread function for the blurred image, and deconvolving a result of the threshold-based text prediction function based on the point spread function. The computer-readable storage medium may store program instructions executable by the one or more processors to cause the computing apparatus to perform iterating at a plurality of scales the generating, estimating, and deconvolving. The computer-readable storage medium may store program instructions executable by the one or more processors to cause the computing apparatus to perform executing a final deconvolution of a result of the iteratively deconvolving, as described herein. Other embodiments of the deblurring may be at least partially implemented by hardware circuitry and/or firmware stored, for example, in a non-volatile memory.

Figure 5A:
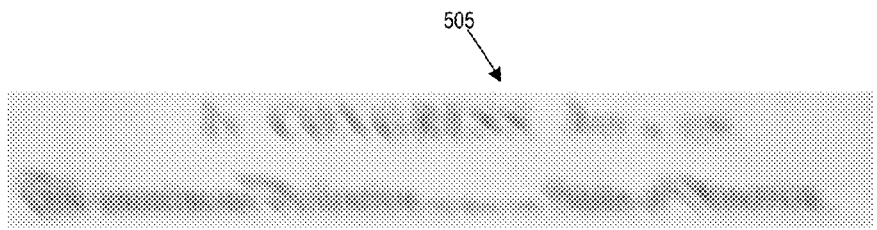
FIG. 5A illustrates a first blurred image usable to implement deblurring of text images using threshold-based text prediction according to some embodiments.
Figure 5B:
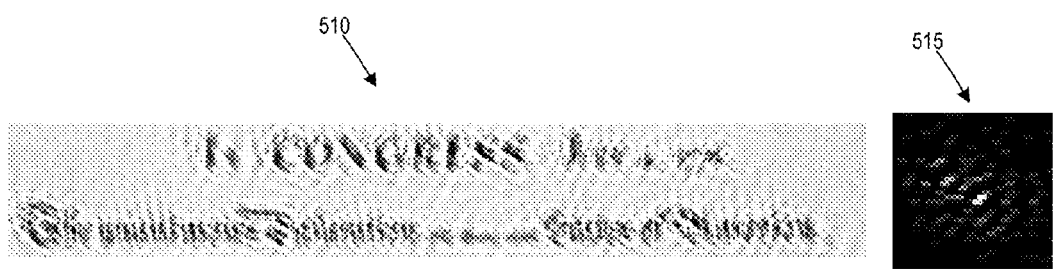
FIG. 5B depicts a result of deblurring of text using previous techniques.
Figure 5C:
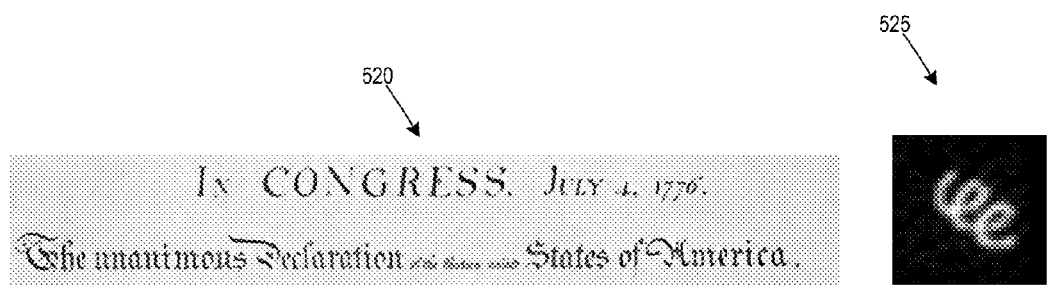
FIG. 5C illustrates a result of deblurring of text using threshold-based text prediction according to some embodiments.

Some embodiments include an automatic procedure for deblurring text images. Embodiments exploit the observation that text images exhibit certain properties different from the properties of natural images. Some embodiments employing the procedures described herein perform blind deblurring and use text prediction and text image restoration designed around the properties of text images. FIGS. 5A-5C show a comparison between deblurred results of a previous deblurring method and some embodiments. The input blurred image of FIG. 5A contains only small characters. Due to differences in the respective properties of text and natural images, the previous deblurring method shown in FIG. 5B fails to deblur and its result shows only artifacts. In contrast, the result of the embodiment shown in FIG. 5C shows recognizable characters.

Figure 7:
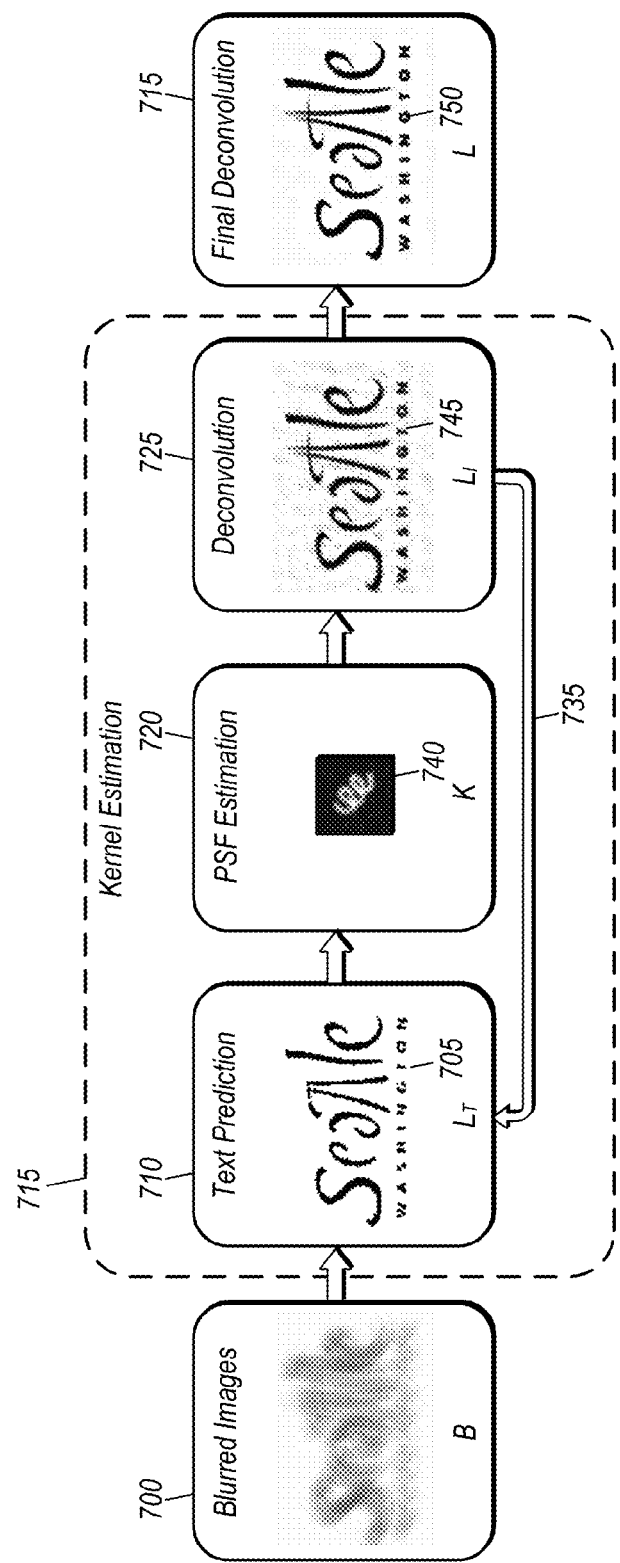
FIG. 7 depicts a process for text blur reduction using threshold-based text prediction according to some embodiments.

Some embodiments take a single blurred text image as input, estimate a blur kernel and restore a latent image. FIGS. 7-8D show flowcharts for an overview of embodiments of the methods and systems discussed herein. Embodiments are described below with respect to a convolutional blur model in which B=K*L+N, where B represents the blurred image, K represents a blur kernel, L represents a latent image, and N represents noise. One algorithm for implementing an embodiment of the methods disclosed herein is:

---
Algorithm 1 Single text image deblurring method procedure DEBLUR(B)
        $L_I \leftarrow B$
        K ← delta function at the kernel center
        for coarse to fine do
            for iter = 1 to max_iters do
                $L_T \leftarrow$ PredictTextImage($L_I$)
                K ← EstimatePSF($L_T$,B)
                $L_I \leftarrow$ Deconvolve(K,B)
            end for
        end for
        L ← FinalDeconvolve(K,B)
    end procedure

---

In the kernel estimation operation, some embodiments refine the blur kernel iteratively. Some embodiments perform the algorithm in a coarse to fine manner to estimate the blur kernel more efficiently, to deal with large blurs, and to avoid local minima.

Some embodiments employ text prediction using an estimate of the two-tone latent image $L_T$ in which the intensities of text pixels and background pixels remain consistent. Such embodiments first apply bilateral filtering to the current estimate of $L_I$, and apply thresholded shock filtering. Some embodiments further process text by consistently thresholding on text images. To separate text from background in a given blurred image, some embodiments first perform image clustering based on pixel intensities. By doing this, embodiments assign different clusters for text and background in $L_I$. However, embodiments do not limit the clustering method and the number of clusters for predicting texts. After clustering, some embodiments fit the distribution of the pixel intensities using the Gaussian mixture model $$p(x) = \sum_{k=1}^{K} \pi_k \mathcal{N}\left(x \mid \mu_k, \sum_k\right), \quad (8)$$

where x is the index of pixel intensities, K is the number of clusters, $\pi_k$ is the mixing coefficient of the k-th cluster, and $\mu_k$ and $\Sigma_k$ are the mean intensity and the covariance matrix of the k-th cluster. In some embodiments, p(x) is used as the reliability of the intensity x in $L_I$ in the kernel estimation operation.

Figure 9A:
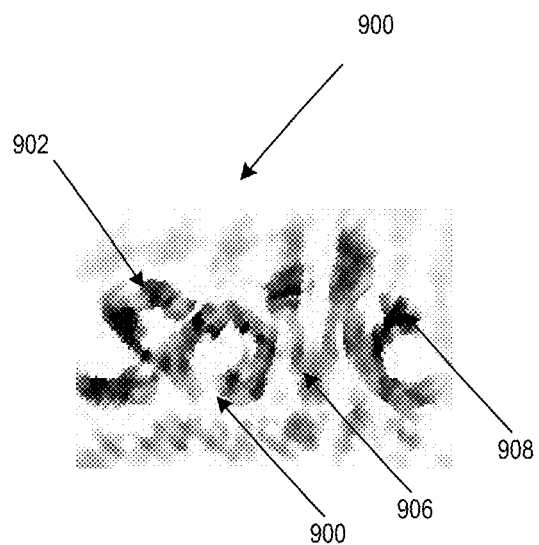
FIG. 9A illustrates an example of text prediction according to previous techniques.
Figure 9B:
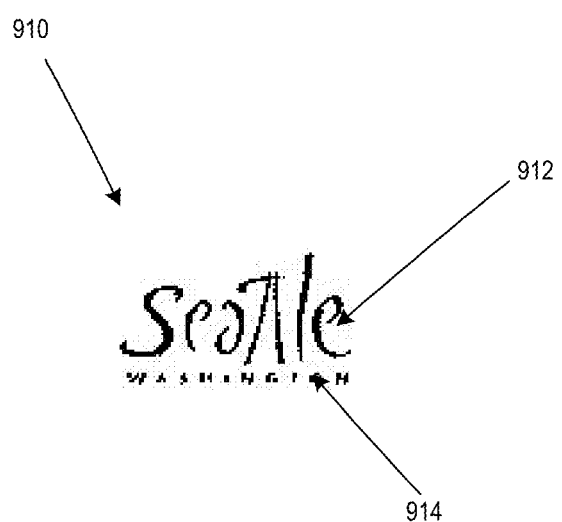
FIG. 9B illustrates an example of threshold based text prediction according to some embodiments.

Because the intensity of text is different from that of background, embodiments measure different Gaussian distributions for text and background. Referencing the distributions, embodiments apply thresholding on the intermediate latent image $L_I$ and remove intermediate intensity values between text and background intensities. Since the intermediate intensity values mostly come from the blur process, by doing this embodiments can separate texts from background. FIGS. 9A-9B show an example of predicted text image $L_T$ using a thresholding-based method.

Some embodiments perform PSF estimation to estimate the blur kernel K using $L_T$ and the input blurred image B by optimizing $E_K(K)=w\|K*\nabla L_T-\nabla B\|^2 \lambda_{K\rho K}(K)$, (9) where w is a pixel weight which comes from p(x) in Eq. (8) to consider the reliability of $L_T$ intensities, $\nabla$ is the derivative operator, $\rho_k$ is a regularization function for stabilizing the linear system, and $\lambda_k$ is a relative weight for the regularization term. In some embodiments, $\rho_K(K)=\|K\|^2$. As eq. (9) is a quadratic function based on image gradients, it can be optimized by some embodiments.

Some embodiments perform iterative deconvolution by updating the latent image $L_I$ using the input blurred image B and the current estimate of K. To do that, some embodiments optimize $E_L/(L_I)=\|K*L_I-B\|^2+\lambda_{T\rho T}(L_I)$, (10) where $\rho_T$ is an image prior or a regularization function for the intermediate text image $L_I$. $\lambda_T$ is a relative weight. Some embodiments are designed around an assumption that text images are two-tone, and the gradients of text images, $L_I$, are therefore expected to be either ±D or 0, where D is the difference between the intensity of texts and that of background. The gradients of ±D appear along the boundaries of texts, and the gradients of 0 appear inside texts or background. Thus, embodiments model $\rho_T$ as $\|(\nabla L_I-D)(\nabla L_I-0)(\nabla L_I+D)\|^2$. Optimizing Eq. (10) is done in some embodiments using an alternating optimization strategy with half-quadratic splitting. The estimated $L_I$ in this operation is used for computing $L_T$ at the next iteration. Thus, $L_I$ does not directly affect the final latent image L, and is only relevant to estimating K.

Some embodiments perform a final deconvolution to compute the final image L with the input blurred image B and the estimated PSF K. To do that, such embodiments optimize $E_L(L)=\|K*L-B\|^2+\lambda_{T\rho T}(L)+\lambda_{S\rho S}(L)$, (11) where $\rho_s$ is an image prior or a regularization function for sparsity. To get a sharper and clear latent image, some embodiments adopt a hyper-Laplacian prior, i.e., $$\rho s(L) = \sum_p |\partial_x L(p)|^\alpha + \sum_p |\partial_y L(p)|^\alpha, \quad (12)$$

where p indexes each pixel position in L, and $\partial_x$ and $\partial_y$ are x- and y-directional derivative operators, respectively. $\lambda_k$ is a relative weight for the regularization term. In some embodiments, $\alpha=0.8$ is used. Some embodiments optimize equation 11 using a re-weighted least squares method.

Example Embodiments

Figure 2A:
FIG. 2A illustrates a first blurred image usable to implement deblurring of images according to some embodiments.
Figure 10:
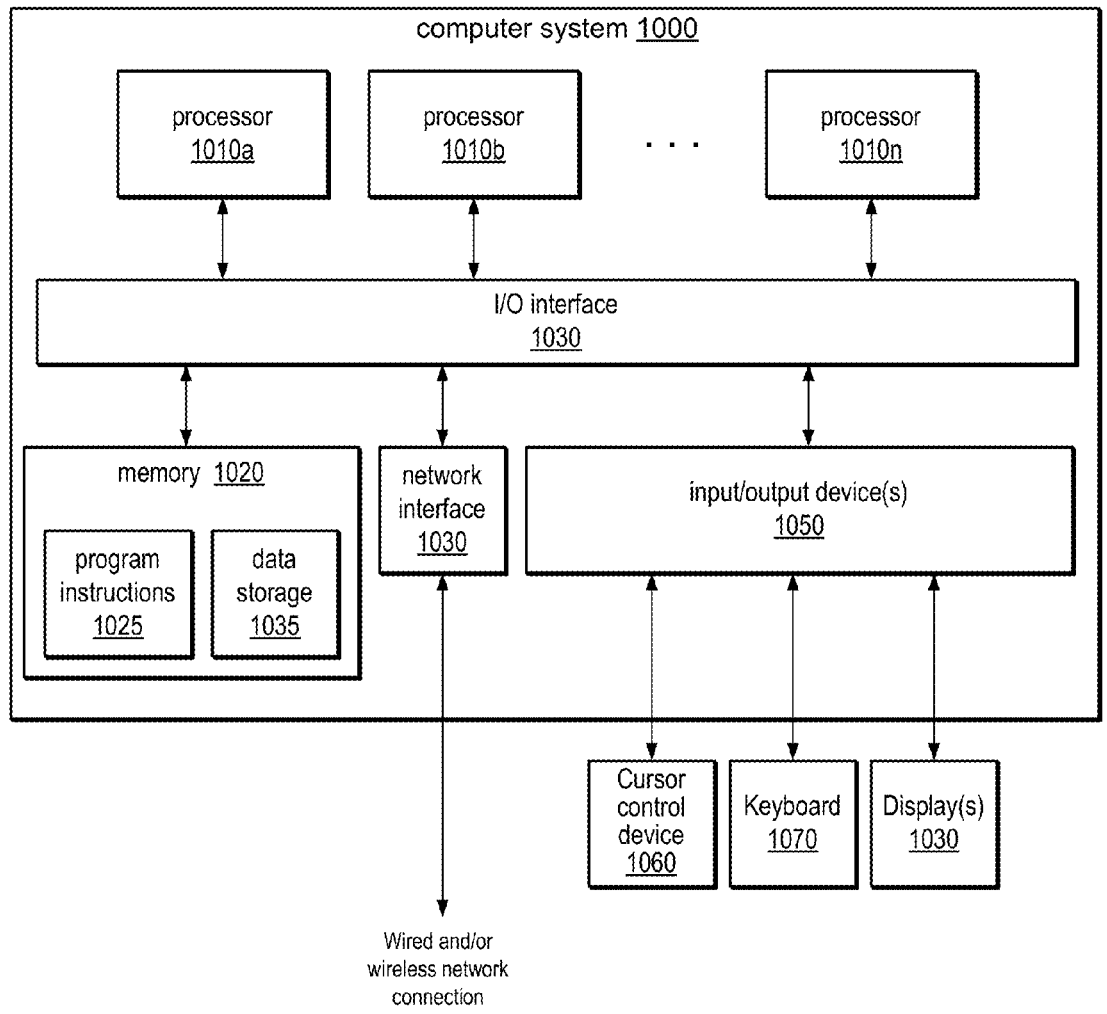
FIG. 10 illustrates an example computer system that may be used in embodiments.

FIG. 1 illustrates a deblurring module that may implement one or more of the deblurring image editing techniques and tools explained with respect to FIG. 2A-9. Deblurring module 120, for example, implements one or more of methods and systems for text blur reduction using threshold-based text prediction and blur reduction incorporating gradient profile upsampling. FIG. 10 illustrates an example computer system on which embodiments of deblurring module 120 may be implemented. Deblurring module 120 receives as input an input image 110. Example images are shown in FIGS. 2A and 5A. Deblurring module 120 may receive user input 112 activating a deblurring image editing tool or a text deblurring image editing tool. Deblurring module 120 then recovers a latent image or multiple latent images from input image 110, according to user input 112 received via user interface 122, using various functions as described herein. Module 120 generates as output one or more output images 130, which are an estimate of the latent image in input image 110. Output image(s) 130 may, for example, be stored to a storage medium 140, such as system memory, a disk drive, DVD, CD, etc.

In some embodiments, deblurring module 120 may provide a user interface 122 via which a user may interact with the deblurring module 120, for example to activate a deblurring image editing tool or a text deblurring image editing tool. In some embodiments, the user interface may provide user interface elements whereby the user may select options including, but not limited to, deblurring individual images or whole video streams. In some embodiments, the user interface may provide user interface elements whereby the user may specify options such as pixel sampling and thresholds of text-to-background change, as well as thresholds of iterative change. In some embodiments, the user interface may provide user interface elements whereby the user may specify which layers data is to be sampled from and/or painted to.

Deblurring module 120 contains a gradient profile manipulation module 150 for use of gradients and resizing to upsample input images 110 for deblurring. In some embodiments, gradient profile manipulation module 150 performs generating an estimate of a latent image from a blurred image using an upsampling super-resolution function, which in some embodiments is repeated from a coarse to a fine scale. In some embodiments, generating the estimate of the latent image of the blurred image using the super-sampling function further includes estimating a gradient of a transformed latent image and estimating the latent image at an increased scale using a function of the gradient of the transformed latent image. In some embodiments, the generating the estimate of the latent image of the blurred image using the super-sampling function further includes estimating a gradient of a transformed latent image as a function of the gradient of an initial latent image, and estimating the latent image at the increased scale using a function of the gradient of the transformed latent image. In some embodiments, the generating the estimate of the latent image of the blurred image using the super-sampling function further includes estimating a gradient of a transformed latent image as a function of the gradient of an initial latent image and estimating the latent image at the increased scale using a sum of a square of an absolute value of a difference of a convolution of a blur kernel with the estimate of the latent image and an initial blurred image and a function of a square of an absolute value of a difference of a gradient of the estimate of the latent image and the gradient of the transformed latent image.

In some embodiments, a thresholding text prediction module 160 identifies regions of probable text in input images 110 and performs generating a threshold-based text prediction for a blurred image. In some embodiments, thresholding text prediction module 160 performs generating a pixel-value histogram for the blurred image, identifying a first peak of the pixel value histogram as a text color, identifying a second peak of the pixel value histogram as the background color, and selecting a threshold value between the first peak and the second peak. In some embodiments, a filtering module 195 performs generating a blurred image from an input image 110 by sharpening the input image 110. In some embodiments, generating the blurred image includes applying shock filtering and bilateral filtering on an input image 110.

Some embodiments of deblurring module 120 perform updating a latent image estimate by optimizing a function of the latent image and a regularization term. In some embodiments, optimizing the function of the latent image and the regularization term further includes calculating the regularization term as a function of the square of the absolute value of a product of the gradient of the latent image, a difference of the gradient of the latent image and a difference of an intensity of text and an intensity of background, and a sum of the gradient of the latent image and the difference of the intensity of text and the intensity of background. In some embodiments, the optimizing the function of the latent image and the regularization term further comprises calculating the regularization term using an alternating optimization strategy with quadratic half-splitting.

In some embodiments, a deconvolution module 170 calculates a latent image from one or more input images 110. In some embodiments, deconvolution module 170 performs deconvolving a result of the threshold-based text prediction function based on the point spread function and executing a final deconvolution of a result of the iteratively deconvolving. In some embodiments, a PSF estimation module 180 estimates a point spread function for the input images 110 or blurred images used as intermediates. In some embodiments, PSF estimation module performs estimating a blur kernel based on the estimate of the latent image and the blurred image, which in some embodiments is repeated from a coarse to a fine scale. In some embodiments, each of these modules is used iteratively until result images stabilize, for example to perform iterating at a plurality of scales the generating, estimating, and deconvolving.

A frame generation module 180 then produces an output image 130 reflecting the latent image. In some embodiments, frame generation module performs generating a final image estimate. In some embodiments the generating the final image estimate includes use of deconvolution module 170 to perform a deconvolution of the latent image using the blur kernel and the blurred image. In some embodiments, performing a deconvolution of the latent image using the blur kernel and the blurred image further includes calculating a final latent image using a sum of a square of an absolute value of a difference of a convolution of the latent image with a blur kernel, and the blurred image and regularization function. In some embodiments, the regularization function comprises a hyperlaplacian prior. In some embodiments, the upsampling super-resolution function further comprises a gradient-preserving upsampling function.

FIG. 2A illustrates a first blurred image usable to implement deblurring of images according to some embodiments. A blurred input image 200 is shown.

Figures 2B, 2C:
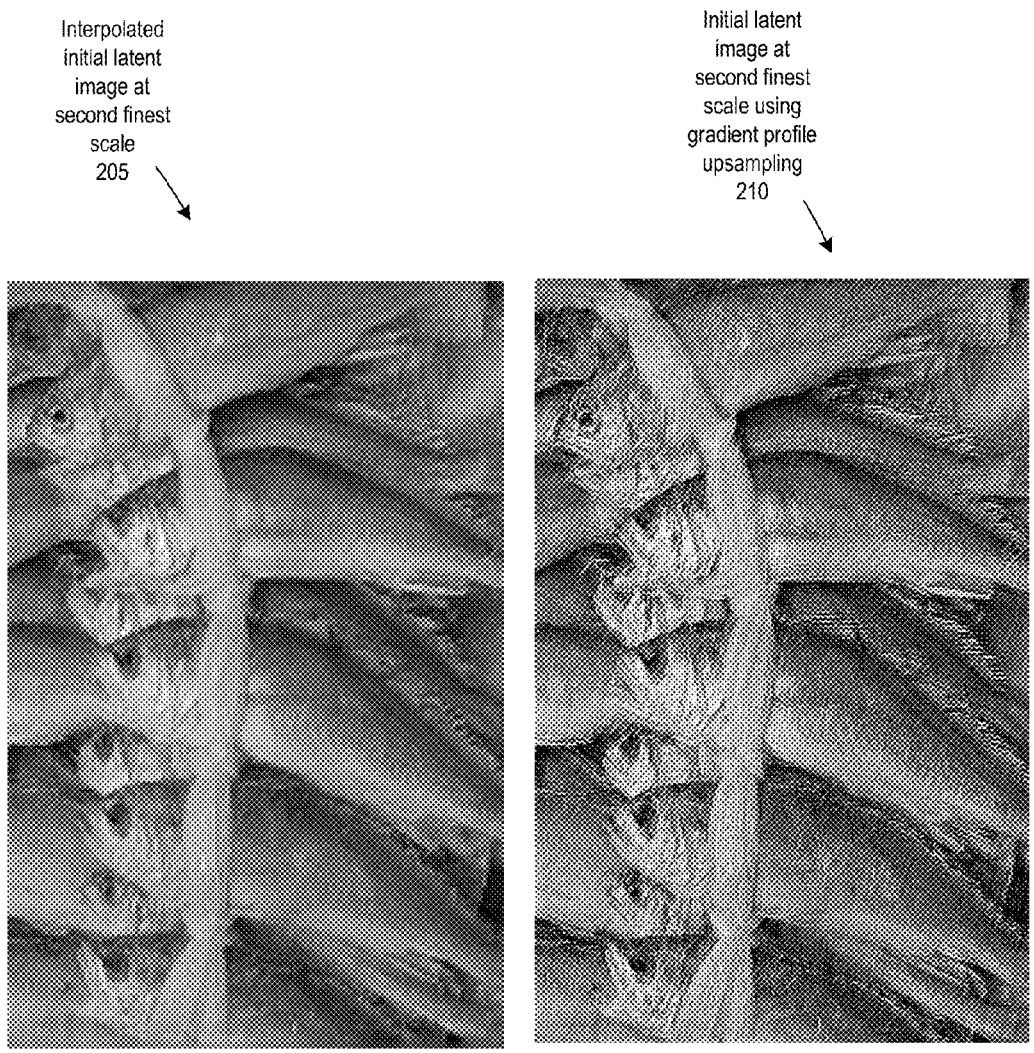
FIG. 2B depicts an interpolated initial latent image according to conventional methods.
FIG. 2C illustrates an initial latent image using gradient profile upsampling for deblurring according to some embodiments.

FIG. 2B depicts an interpolated initial latent image according to conventional methods. An interpolated initial image at a second finest scale 205 is shown.

FIG. 2C illustrates an initial latent image using gradient profile upsampling for deblurring according to some embodiments. An initial latent image at second finest scale using gradient profile upsampling 210 is shown.

FIG. 2D depicts a deblurred result using conventional methods. A deblurred result using interpolation 215 is shown.

FIG. 2E illustrates a deblurred result using blur reduction incorporating gradient profile upsampling. A deblurred result using gradient profile upsampling 220 is shown.

FIG. 2F depicts a deblurred result using conventional methods. A deblurred result using interpolation 225 is shown.

FIG. 2G illustrates a deblurred result using blur reduction incorporating gradient profile upsampling according to some embodiments. A deblurred result using gradient profile upsampling 230 is shown.

FIG. 2H depicts a deblurred result using conventional methods. A deblurred result using interpolation 235 is shown.

FIG. 2I illustrates a deblurred result using blur reduction incorporating gradient profile upsampling according to some embodiments. A deblurred result using gradient profile upsampling 240 is shown.

Figure 2J:
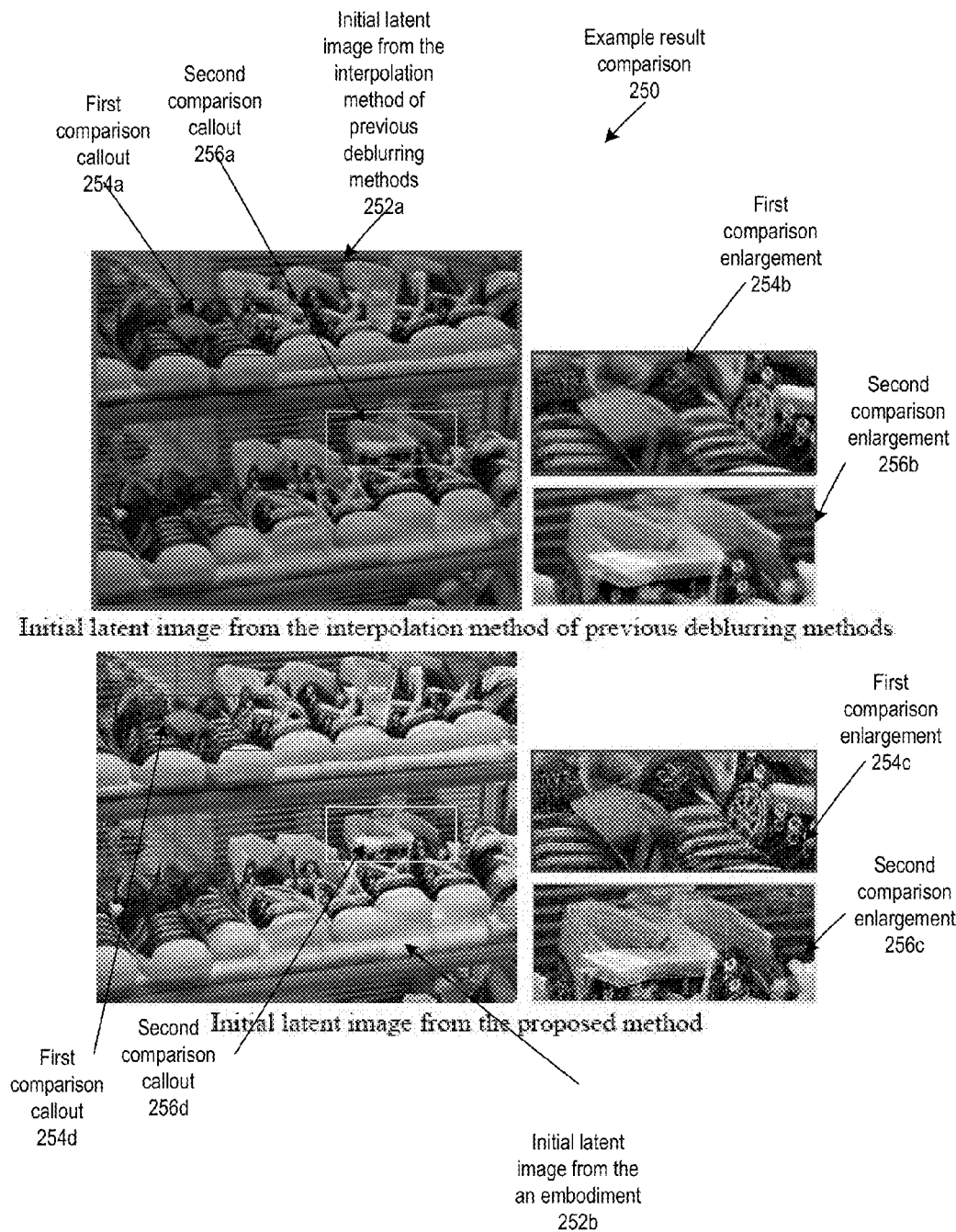
FIG. 2J depicts a comparison of deblurred results using interpolation and blur reduction incorporating gradient profile upsampling according to some embodiments.

FIG. 2J depicts a comparison of deblurred results using interpolation and blur reduction incorporating gradient profile upsampling according to some embodiments. In an example result comparison 250, an initial latent image from the interpolation method of previous deblurring methods is 252a shown with a first comparison callout 254a and a second comparison callout 256a corresponding to a first comparison enlargement 254b and a second comparison enlargement 256b, respectively. These can be compared to a first comparison enlargement 254c and a second comparison enlargement 256c corresponding to a first comparison callout 254d and a second comparison callout 256d an initial latent image from an embodiment 252b.

Figure 2K:
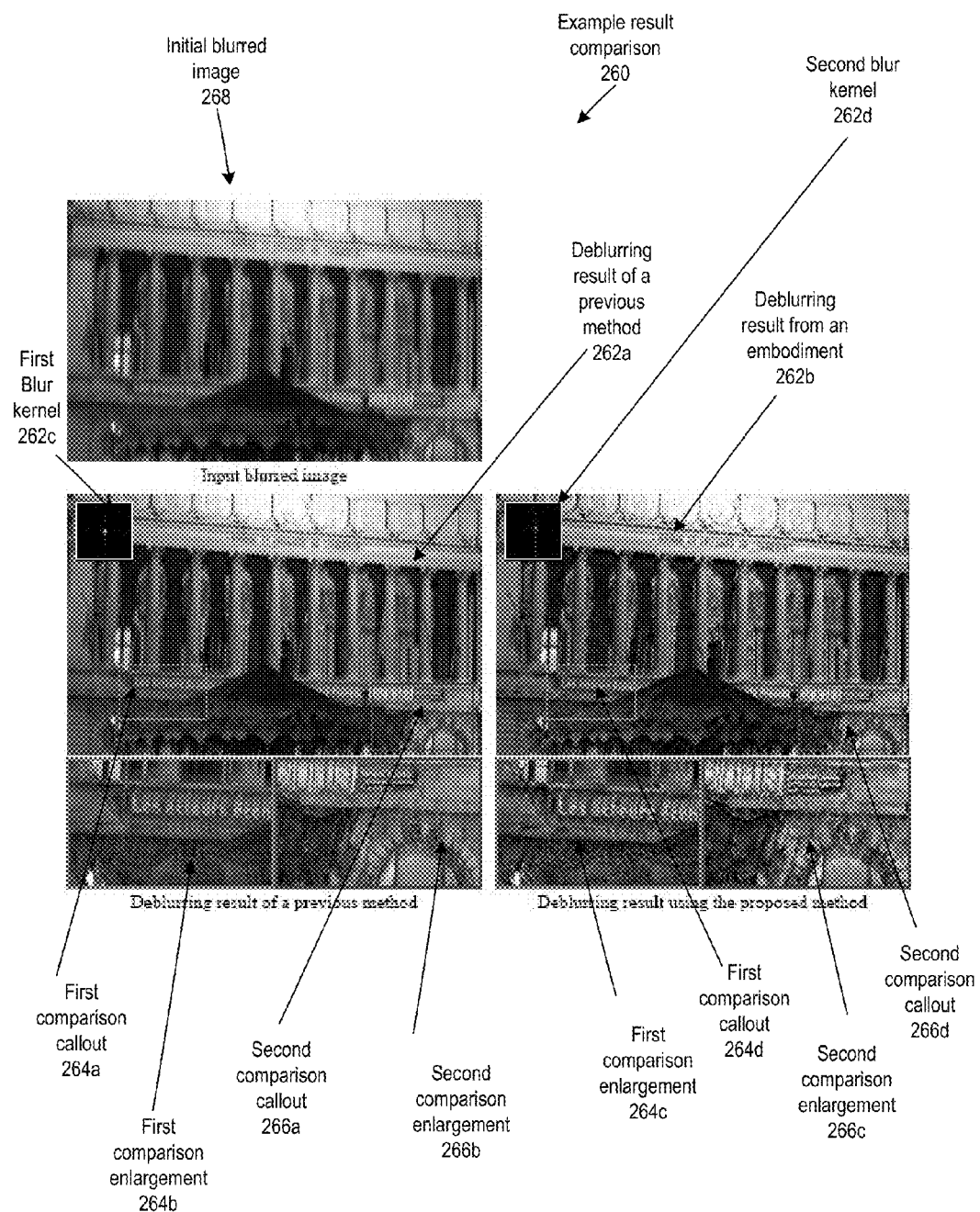
FIG. 2K illustrates a comparison of deblurred results using interpolation and blur reduction incorporating gradient profile upsampling according to some embodiments.

FIG. 2K illustrates a comparison of deblurred results using interpolation and blur reduction incorporating gradient profile upsampling according to some embodiments. In an example result comparison 260 based on an input blurred image 268, a deblurring result from a previous method is shown 262a with a first comparison callout 264a and a second comparison callout 266a corresponding to a first comparison enlargement 264b and a second comparison enlargement 266b, respectively. These can be compared to a first comparison enlargement 264c and a second comparison enlargement 266c corresponding to a first comparison callout 264d and a second comparison callout 266d an initial latent image from an embodiment 262d. Additionally, a first blur kernel 262c and a second blur kernel 262d are provided.

FIG. 3 depicts a process for blur reduction using blur reduction incorporating gradient profile upsampling according to some embodiments. A blurred image (B) 300 is received and multi-scale processing 315 is iterated 340 before a final deconvolution 330 is performed to generate a latent image 345. One embodiment of multi-scale processing 315 includes performing latent image scale adjustment 310 on a latent image ($L_s$) 335 and performing kernel estimation 320 to generate a blur kernel (K) 325.

Figure 4A:
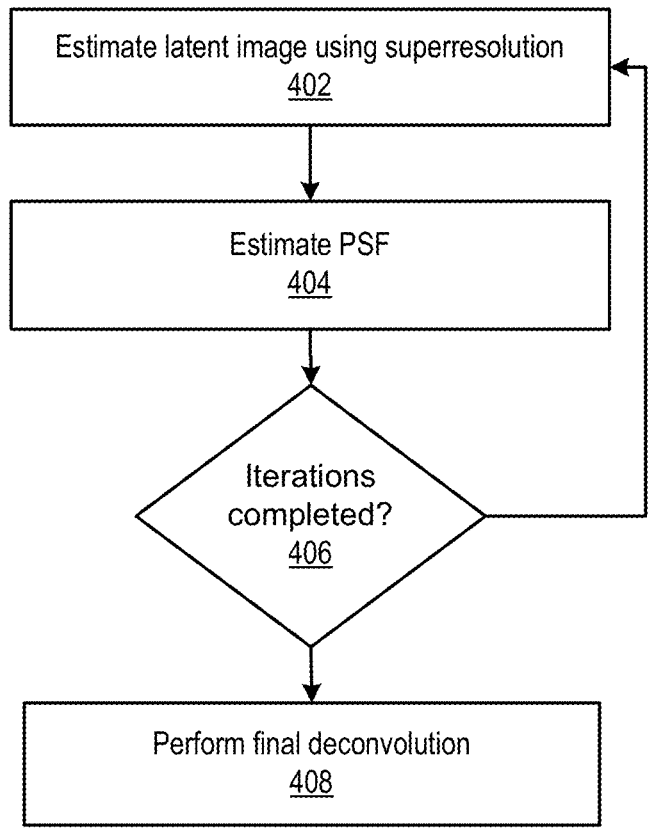
FIG. 4A is a high-level visual flowchart of iterative operations that may be performed in blur reduction incorporating gradient profile upsampling according to some embodiments.

FIG. 4A is a high-level visual flowchart of iterative operations that may be performed in blur reduction incorporating gradient profile upsampling according to some embodiments. A latent image is estimated using super resolution (block 402). A point-spread function is estimated (block 404). A determination is made as to whether an adequate set of iterations has been completed (block 406). If sufficient iterations have not been performed, the process returns to block 402, which is described above. If sufficient iterations have been performed, a final deconvolution is performed (block 408).

Figure 4B:
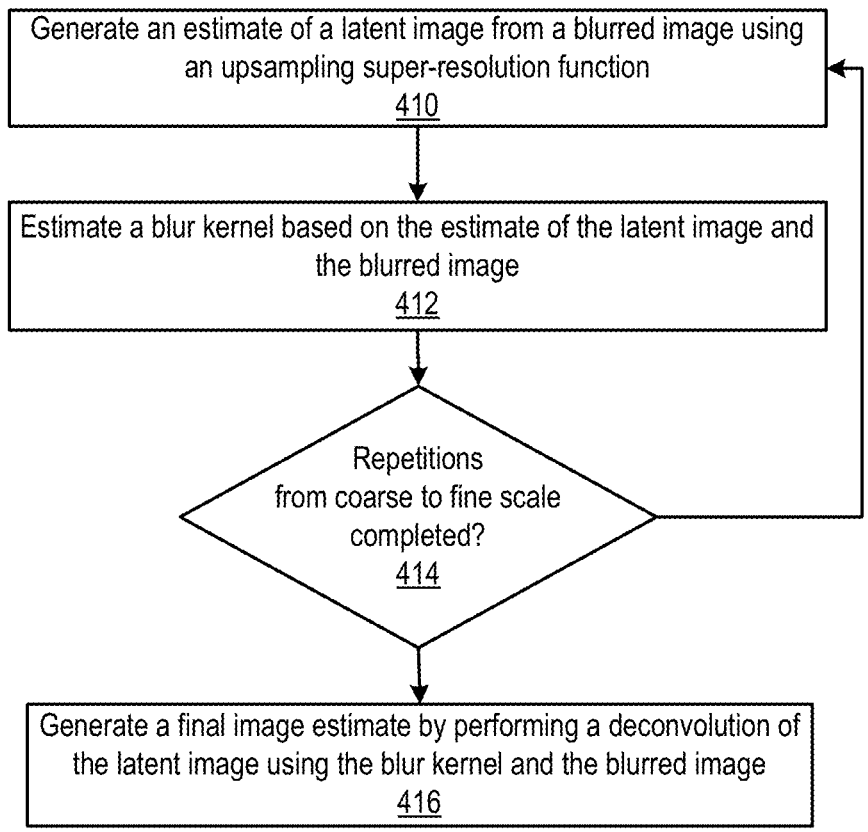
FIG. 4B is a high-level visual flowchart of iterative operations that may be performed in blur reduction incorporating gradient profile upsampling according to some embodiments.
Figure 4C:
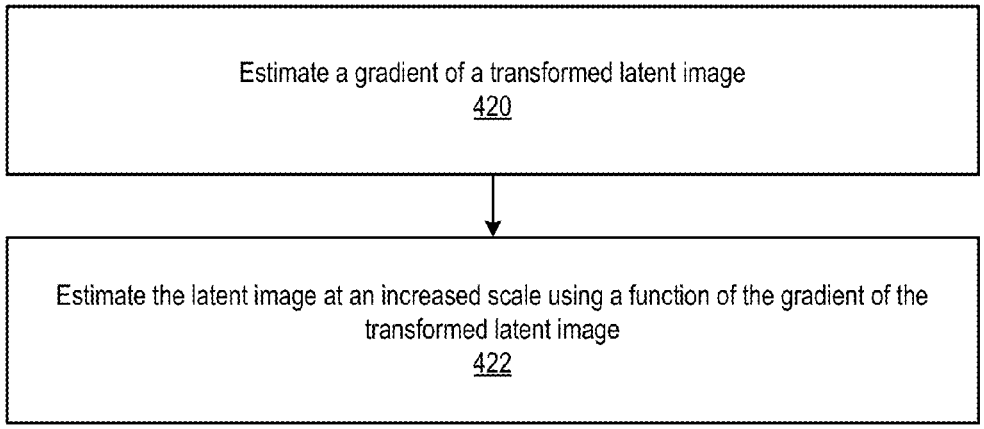
FIG. 4C is a high-level visual flowchart of operations for generating an estimate of a latent image of the blurred image using the super-sampling function that may be performed in blur reduction incorporating gradient profile upsampling according to some embodiments.

FIG. 4B is a high-level visual flowchart of iterative operations that may be performed in blur reduction incorporating gradient profile upsampling according to some embodiments. An estimate of a latent image from a blurred image using an upsampling super-resolution function is generated (block 410). A blur kernel based on the estimate of the latent image and the blurred image is estimated (block 412). A determination is made as to whether an adequate set of iterations or repetitions has been completed from a coarse scale to a fine scale (block 414). If sufficient iterations have not been performed, the process returns to block 410, which is described above. If sufficient iterations have been performed, a final image estimate by performing a deconvolution of the latent image using the blur kernel and the blurred image (block 416).

FIG. 4C is a high-level visual flowchart of operations for generating an estimate of a latent image of the blurred image using the super-sampling function that may be performed in blur reduction incorporating gradient profile upsampling according to some embodiments. A gradient of a transformed latent image is estimated (block 420). The latent image is estimated at an increased scale using a function of the gradient of the transformed latent image (block 422).

Figure 4D:
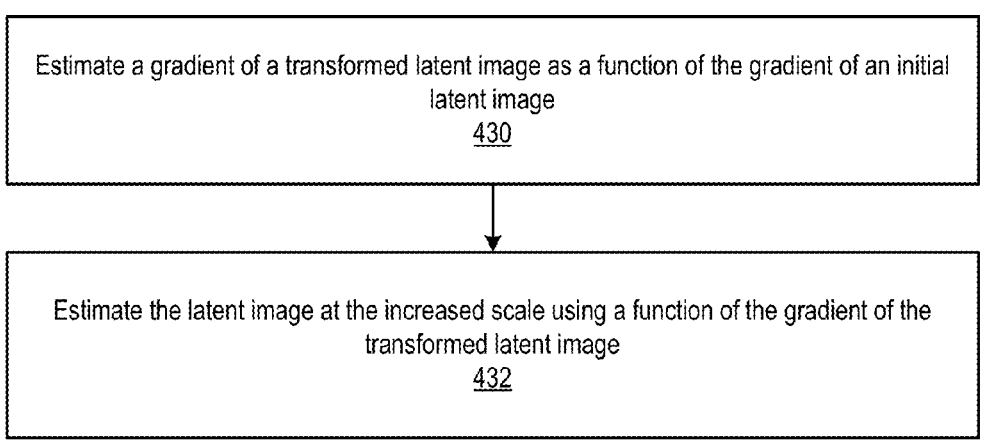
FIG. 4D is a high-level visual flowchart of operations for generating an estimate of a latent image of the blurred image using the super-sampling function that may be performed in blur reduction incorporating gradient profile upsampling according to some embodiments.

FIG. 4D is a high-level visual flowchart of operations for generating an estimate of a latent image of the blurred image using the super-sampling function that may be performed in blur reduction incorporating gradient profile upsampling according to some embodiments. A gradient of a transformed latent image is estimated as a function of the gradient of an initial latent image (block 430). The latent image is estimated at the increased scale using a function of the gradient of the transformed latent image (block 432).

Figure 4E:
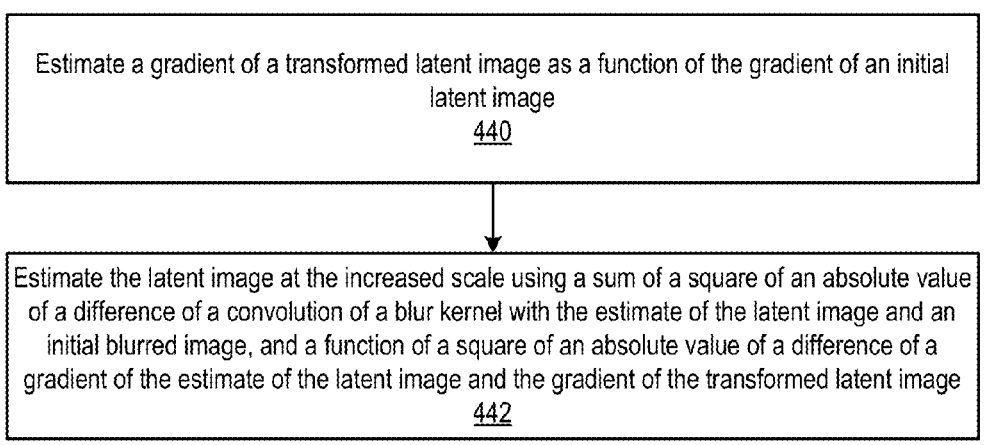
FIG. 4E is a high-level visual flowchart of operations for generating an estimate of a latent image of the blurred image using the super-sampling function that may be performed in blur reduction incorporating gradient profile upsampling according to some embodiments.

FIG. 4E is a high-level visual flowchart of operations for generating an estimate of a latent image of the blurred image using the super-sampling function that may be performed in blur reduction incorporating gradient profile upsampling according to some embodiments. A gradient of a transformed latent image is estimated as a function of the gradient of an initial latent image (block 440). The latent image is estimated at the increased scale using a sum of a square of an absolute value of a difference of a convolution of a blur kernel with the estimate of the latent image and an initial blurred image, and a function of a square of an absolute value of a difference of a gradient of the estimate of the latent image and the gradient of the transformed latent image (block 442).

FIG. 5A illustrates a first blurred image usable to implement deblurring of text images using threshold-based text prediction according to some embodiments. A blurred item of input text 505 is shown.

FIG. 5B depicts a result of deblurring of text using previous techniques. Example of previous techniques 510 fails to deblur the image using an estimated blur kernel 515.

FIG. 5C illustrates a result of deblurring of text using threshold-based text prediction according to some embodiments. Result of embodiments 520 shows clear text using an iteratively estimated blur kernel 525.

Figure 5D:
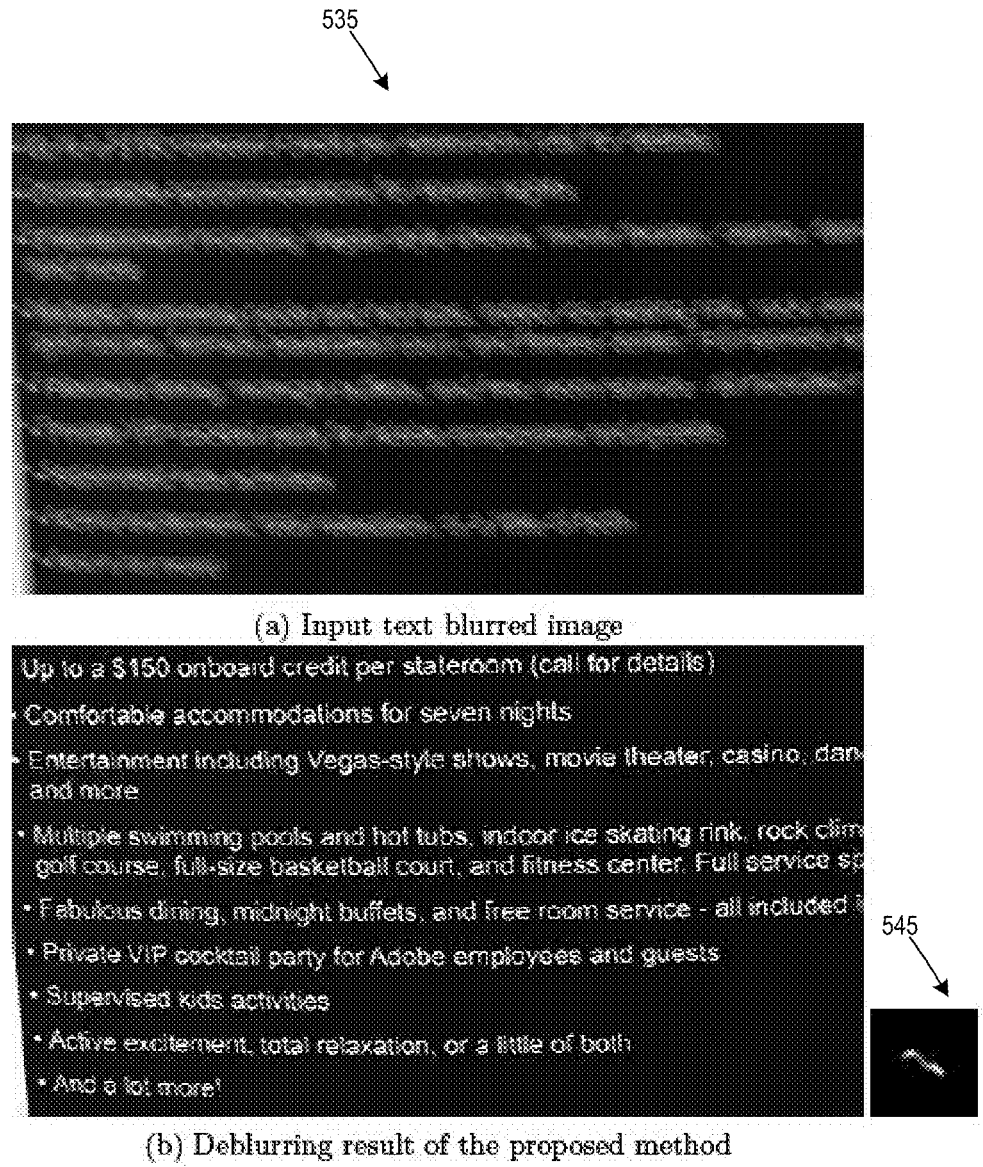
FIG. 5D depicts a comparison of deblurred results using prior techniques and using threshold-based text prediction according to some embodiments.

FIG. 5D depicts an illustration of deblurred results using threshold-based text prediction according to some embodiments. An input image 535 is barely readable, but a deblurring result of some embodiments 540 provides clearly readable text based and is shown with an extraction of blur kernel 545.

Figure 5E:
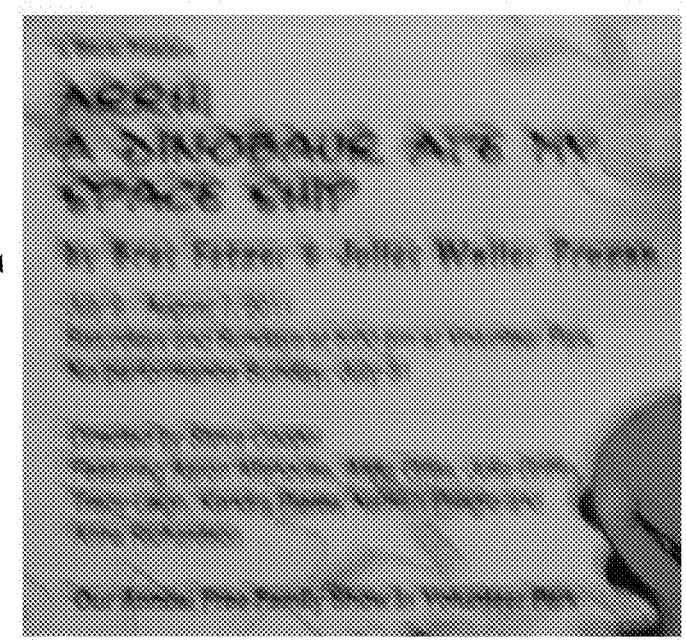
FIG. 5E illustrates a comparison of deblurred results using prior techniques and using threshold-based text prediction according to some embodiments.
Figure 5E:
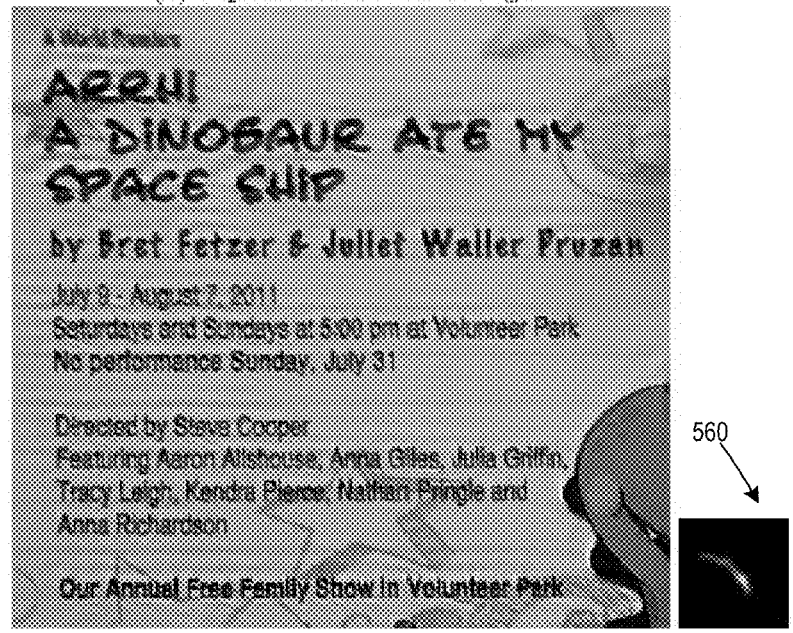

FIG. 5E illustrates a depiction of deblurred results using threshold-based text prediction according to some embodiments. An input image 550 is barely readable, but a deblurring result of some embodiments 555 provides clearly readable text.

Figure 5F:
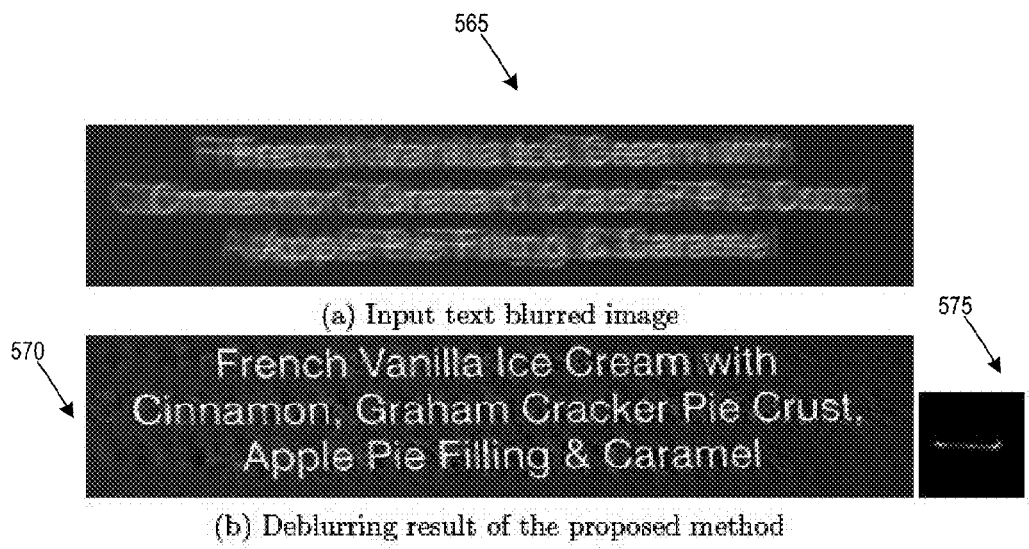
FIG. 5F depicts a comparison of deblurred results using prior techniques and using threshold-based text prediction according to some embodiments.

FIG. 5F depicts an illustration of deblurred results using threshold-based text prediction according to some embodiments. An input image 565 is barely readable, but a deblurring result of some embodiments 570 provides clearly readable text based and is shown with an extraction of blur kernel 575.

Figure 6:
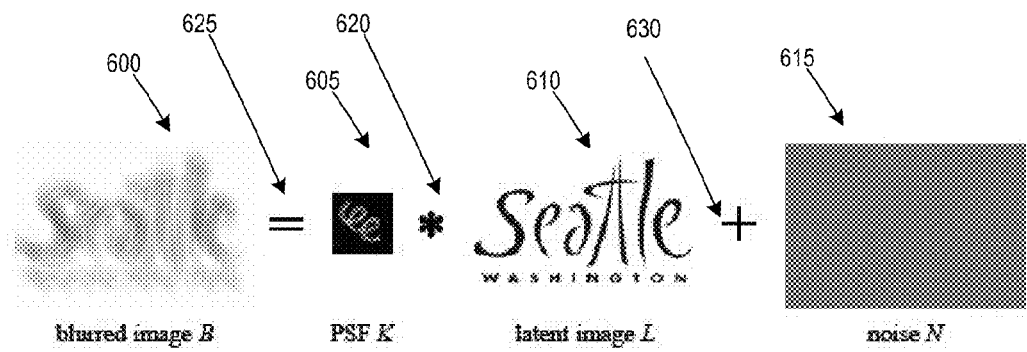
FIG. 6 illustrates a blur model.

FIG. 6 illustrates a blur model. A blurred image (B) 600 is modeled as being equal 625 to a sum of image noise (N) 615 and a convolution 620 of a point spread function 605 with a latent image (L) 610.

FIG. 7 depicts a process for text blur reduction using threshold-based text prediction according to some embodiments. A blurred image (B) 700 is subjected to a kernel estimation process 715 and a final deconvolution 730 to generate a final latent image (L) 750. Text prediction 710 is performed to generate a latent image ($L_T$) 705. Point Spread Function (PSF) estimation 720 is then performed on latent image ($L_T$) 705 to generate a blur kernel (K) 740. A deconvolution 725 is performed on latent image ($L_T$) 705 and blur kernel (K) 740 to generate a latent image latent image ($L_I$) 745, which can be used as an iterative input 735 to text prediction 710.

Figure 8A:
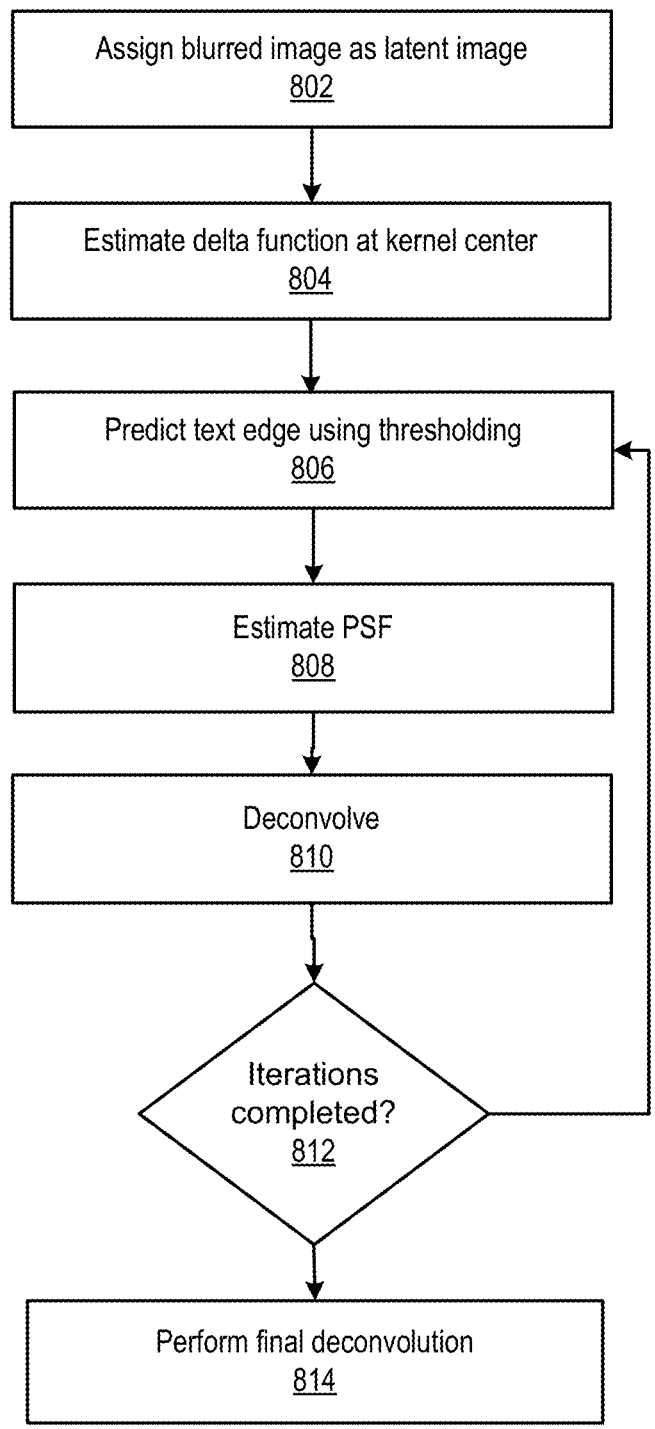
FIG. 8A is a high-level visual flowchart of iterative operations that may be performed in text blur reduction using threshold-based text prediction according to some embodiments.

FIG. 8A is a high-level visual flowchart of iterative operations that may be performed in text blur reduction using threshold-based text prediction according to some embodiments. A blurred image is assigned as a latent image (block 802). A delta function at the kernel center is estimated (block 804). Text is predicted using thresholding (block 806). A point spread function is estimated (block 808). A deconvolution is performed (block 810). A determination is made as to whether sufficient iterations have been completed (block 812). If sufficient iterations have not been performed, the process returns to block 806, which is described above. If sufficient iterations have been performed, a final deconvolution is performed (block 814).

Figure 8B:
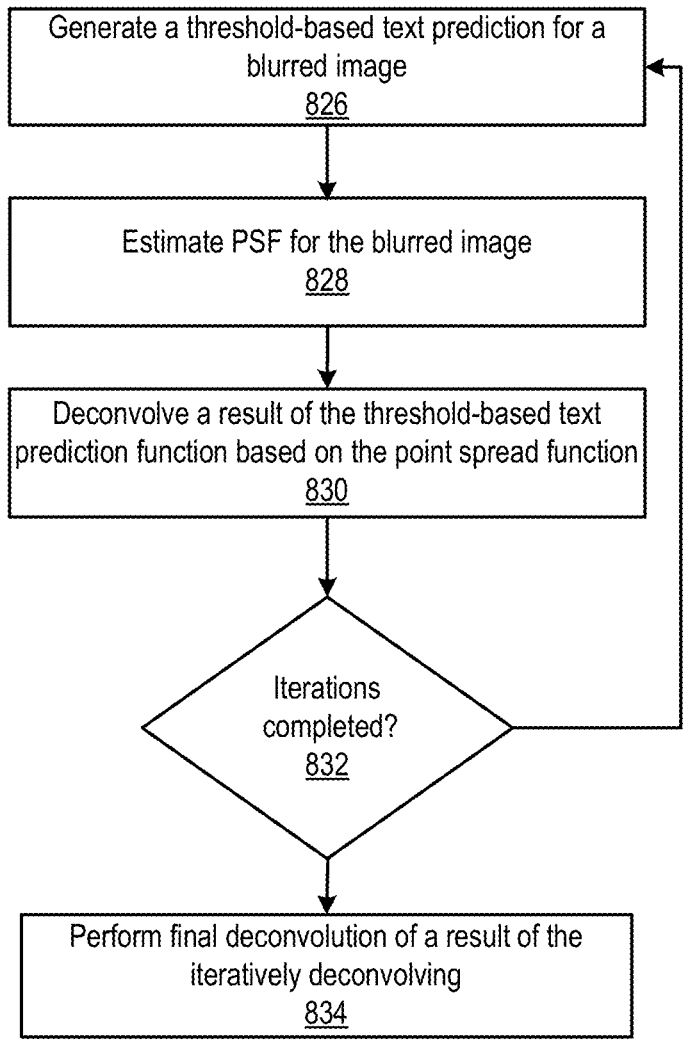
FIG. 8B is a high-level visual flowchart of operations that may be performed in text blur reduction using threshold-based text prediction according to some embodiments.

FIG. 8B is a high-level visual flowchart of operations that may be performed in text blur reduction using threshold-based text prediction according to some embodiments. A threshold-based text prediction for a blurred image is generated (block 826). A point spread function is estimated for the blurred image (block 828). A result of the threshold-based text prediction function is deconvolved based on the point spread function (block 830). A determination is made as to whether sufficient iterations have been completed (block 832). If sufficient iterations have not been performed, the process returns to block 826, which is described above. If sufficient iterations have been performed, a final deconvolution of the result of the iteratively deconvolving is performed (block 834).

Figure 8C:
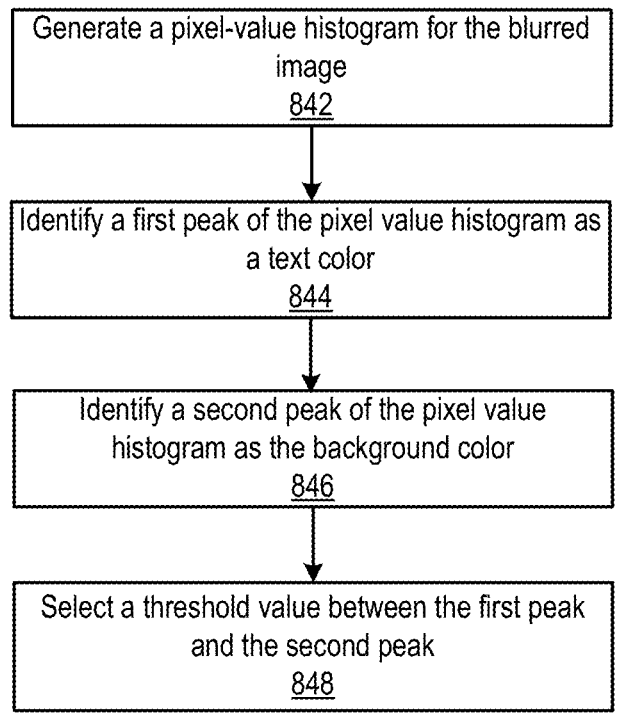
FIG. 8C is a high-level visual flowchart of operations that may be performed in text blur reduction using threshold-based text prediction according to some embodiments.
Figure 8D:
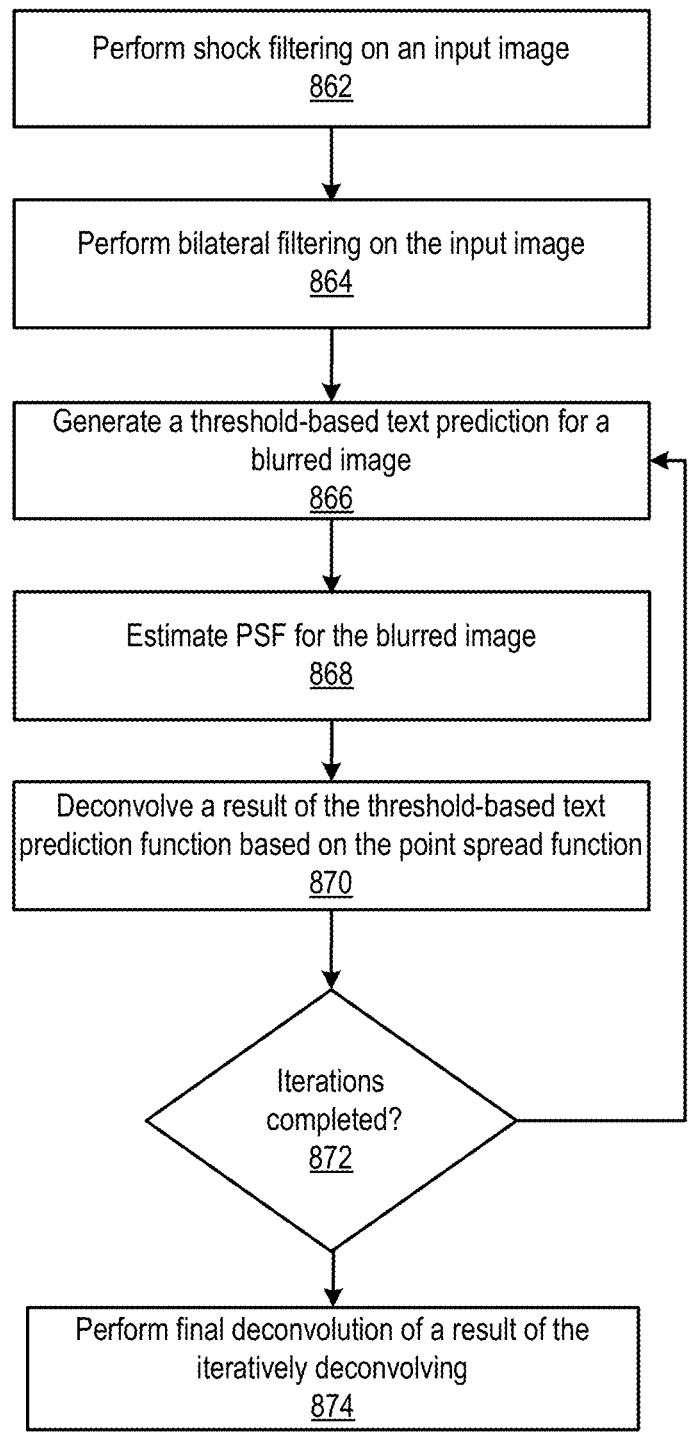
FIG. 8D is a high-level visual flowchart of operations that may be performed in text blur reduction using threshold-based text prediction according to some embodiments.

FIG. 8C is a high-level visual flowchart of operations that may be performed in text blur reduction using threshold-based text prediction according to some embodiments. A pixel-value histogram for the blurred image is generated (block 842). A first peak in the pixel value histogram is identified as a text color (block 844). A second peak in the pixel value histogram is identified as a background color (block 846). A threshold value between the first peak and the second peak is selected (block 848).

FIG. 8D is a high-level visual flowchart of operations that may be performed in text blur reduction using threshold-based text prediction according to some embodiments. Shock filtering is performed on an input image (block 862). Bilateral filtering is performed on the input image (block 864). A threshold-based text prediction for a blurred image is generated using the bilateral and shock filtering (block 866). A point spread function is estimated for the blurred image (block 868). A result of the threshold-based text prediction function is deconvolved based on the point spread function (block 870). A determination is made as to whether sufficient iterations have been completed (block 872). If sufficient iterations have not been performed, the process returns to block 866, which is described above. If sufficient iterations have been performed, a final deconvolution of the result of the iteratively deconvolving is performed (block 874).

FIG. 9A illustrates an example of text prediction according to previous techniques. A blurred image 900 contains a discernable "s" 902, but other portions of the figure appear to contain an "a" 904, a pair of the letter "A" 906 and a "c" 908.

FIG. 9B illustrates an example of threshold based text prediction according to some embodiments. A thresholding result 910 indicates a first row of text 912 spelling out the word "Seattle" and a second row of text 914, which was completely obscured in FIG. 9A, spelling out the word "WASHINGTON."

Example System

Embodiments of a deblurring module and/or of the deblurring image editing techniques as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a deblurring image editing module are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, configured to implement embodiments of a deblurring image editing module as described herein, and data storage 1035, comprising various data accessible by program instructions 1025. In one embodiment, program instructions 1025 may include software elements of embodiments of a deblurring image editing module as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a deblurring image editing module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
using one or more processors to perform
generating a threshold-based text prediction for a blurred image;
estimating a point spread function for the blurred image;
deconvolving a result of the threshold-based text prediction function based on the point spread function;
iterating at a plurality of scales the generating, estimating, and deconvolving, the iterating of the deconvolving including updating a latent image estimate by optimizing a function of the latent image and a regularization term by calculating the regularization term as a function of the square of the absolute value of a product of the gradient of the latent image, a difference of the gradient of the latent image and a difference of an intensity of text and an intensity of background, and a sum of the gradient of the latent image and the difference of the intensity of text and the intensity of background; and
executing a final deconvolution of a result of the iteratively deconvolving.

2. The method of claim 1, wherein the generating the threshold-based text prediction for the blurred image further comprises:
generating a pixel-value histogram for the blurred image;
identifying a first peak of the pixel value histogram as a text color;
identifying a second peak of the pixel value histogram as the background color; and
selecting a threshold value between the first peak and the second peak.

3. The method of claim 1, further comprising:
generating the blurred image, wherein the generating the blurred image comprises sharpening an input image.

4. The method of claim 1, further comprising:
generating the blurred image, wherein the generating the blurred image comprises applying shock filtering and bilateral filtering on an input image.

5. The method of claim 1, wherein the optimizing the function of the latent image and the regularization term further comprises calculating the regularization term using an alternating optimization strategy with quadratic half-splitting.

6. A system, comprising:
at least one processor; and
a memory comprising program instructions, wherein the program instructions are executable by the at least one processor to:
generate a threshold-based text prediction for a blurred image;
estimate a point spread function for the blurred image;
deconvolve a result of the threshold-based text prediction function based on the point spread function;
iterate at a plurality of scales the generating, estimating, and deconvolving, the iteration of the deconvolving including updating a latent image estimate by optimizing a function of the latent image and a regularization term by calculating the regularization term as a function of the square of the absolute value of a product of the gradient of the latent image, a difference of the gradient of the latent image and a difference of an intensity of text and an intensity of background, and a sum of the gradient of the latent image and the difference of the intensity of text and the intensity of background; and
execute a final deconvolution a result of the iteratively deconvolving.

7. The system of claim 6, wherein the program instructions executable by the at least one processor to generate the threshold-based text prediction for the blurred image further comprise program instructions executable by the at least one processor to:
generate a pixel-value histogram for the blurred image;
identify a first peak of the pixel value histogram as a text color;
identify a second peak of the pixel value histogram as the background color; and
selecting a threshold value between the first peak and the second peak.

8. The system of claim 6, further comprising program instructions executable by the at least one processor to:
generate the blurred image, wherein the program instructions executable by the at least one processor to generate the blurred image comprise program instructions executable by the at least one processor to sharpen an input image.

9. The system of claim 6, further comprising program instructions executable by the at least one processor to:
generate the blurred image, wherein the program instructions executable by the at least one processor to generate the blurred image comprise program instructions executable by the at least one processor to apply shock filtering and bilateral filtering on an input image.

10. The system of claim 6, wherein the program instructions executable by the at least one processor to optimize the function of the latent image and regularization term further comprise program instructions executable by the at least one processor to calculate the regularization term using an alternating optimization strategy with quadratic half-splitting.

11. A non-transitory computer-readable storage medium storing program instructions, wherein the program instructions are computer-executable to implement:
generating a threshold-based text prediction for a blurred image;
estimating a point spread function for the blurred image;
deconvolving a result of the threshold-based text prediction function based on the point spread function;
iterating at a plurality of scales the generating, estimating, and deconvolving, the iterating of the deconvolving including updating a latent image estimate by optimizing a function of the latent image and a regularization term by calculating the regularization term as a function of the square of the absolute value of a product of the gradient of the latent image, a difference of the gradient of the latent image and a difference of an intensity of text and an intensity of background, and a sum of the gradient of the latent image and the difference of the intensity of text and the intensity of background; and
executing a final deconvolution a result of the iteratively deconvolving.

12. The non-transitory computer-readable storage medium of claim 11, further comprising program instructions computer-executable to implement:
generating a pixel-value histogram for the blurred image;
identifying a first peak of the pixel value histogram as a text color;
identifying a second peak of the pixel value histogram as the background color; and
selecting a threshold value between the first peak and the second peak.

13. The non-transitory computer-readable storage medium of claim 11, further comprising program instructions computer-executable to implement:
generating the blurred image, wherein the generating the blurred image comprises sharpening a blurred image.

14. The non-transitory computer-readable storage medium of claim 11, further comprising program instructions computer-executable to implement:
generating the blurred image, wherein the generating the blurred image comprises applying shock filtering and bilateral filtering on an input image.

* * * * *

UNITED STATES PATENT AND TRADEMARK OFFICE
CERTIFICATE OF CORRECTION

| | | |
|---|---|---|
| PATENT NO. | : 8,705,881 B2 | Page 1 of 1 |
| APPLICATION NO. | : 13/475483 | |
| DATED | : April 22, 2014 | |
| INVENTOR(S) | : Jue Wang et al. | |

It is certified that error appears in the above-identified patent and that said Letters Patent is hereby corrected as shown below:

In the Claims:

Column 20, Line 10, Claim 10, after "…latent image and" before "regularization", insert -- the --, therefor.

Signed and Sealed this
Eighth Day of July, 2014

Michelle K. Lee
*Deputy Director of the United States Patent and Trademark Office*